Feb. 15, 1944. R. J. STANLEY ET AL 2,341,669
WINDSHIELD WIPER MOTOR
Filed Aug. 19, 1940 2 Sheets-Sheet 1

Inventors
WILLIAM J. MARTERSTECK,
AND RAYMOND J. STANLEY
By Beaman & Langford
Attorneys Feb. 15, 1944.   R. J. STANLEY ET AL   2,341,669
WINDSHIELD WIPER MOTOR
Filed Aug. 19, 1940   2 Sheets-Sheet 2
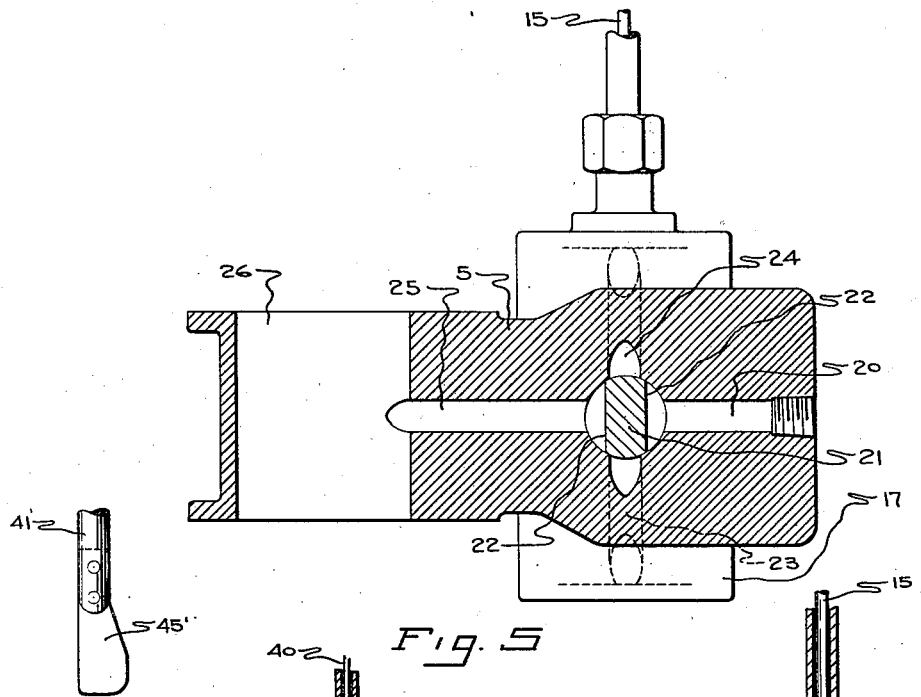
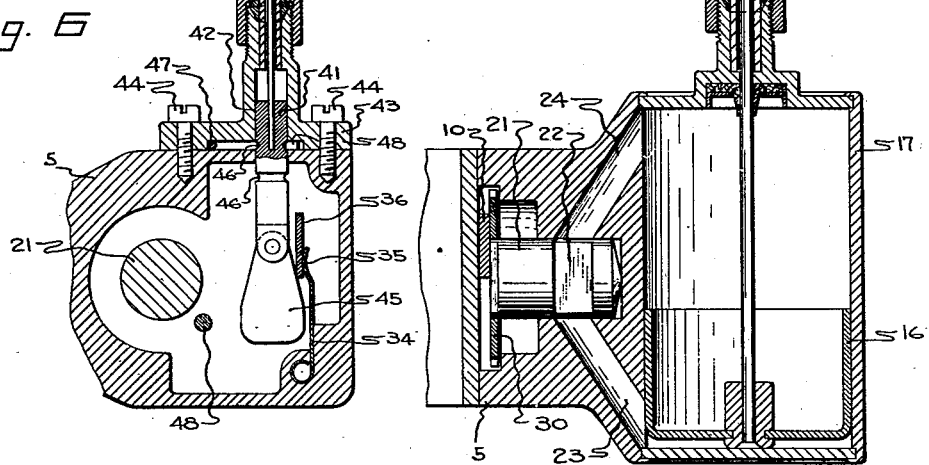
Inventors
WILLIAM J. MARTERSTECK,
AND RAYMOND J. STANLEY
By Beaman & Langford
Attorneys Patented Feb. 15, 1944

2,341,669

UNITED STATES PATENT OFFICE 2,341,669

WINDSHIELD WIPER MOTOR

Raymond Joseph Stanley and William John Martersteck, Jackson, Mich., assignors to Townsend F. Beaman, Jackson, Mich., as trustee Application August 19, 1940, Serial No. 353,216

5 Claims. (Cl. 74—128)

The present invention relates to accessory actuating mechanism for internal combustion engines and more particularly to mechanism for actuating windshield wipers actuated by oil pressure from the engine lubricating system. The invention constitutes an embodiment of the windshield wiper mechanism disclosed in Patent No. 2,191,356, issued to S. A. Snell, and in general has the same objects and accomplishes the same results as the structure disclosed in said patent.

In the aforesaid patent the windshield wiper mechanism includes an oil pressure actuated motor and an actuating valve therefor which are arranged in an assembly for connection to the oil pump housing of an internal combustion engine. According to the present invention, the motor and its valve are included together in association with the fuel pump and the valve is driven by the moving part of the internal combustion engine employed to actuate the fuel pump. In addition the present invention includes a novel parking arrangement for insuring the stopping of the movement of the windshield wiper at the end of a stroke.

An object of the present invention is to provide an oil pressure actuated windshield wiper associated with an internal combustion engine, which operates at a speed timed by a moving element of the internal combustion engine employed for actuating the fuel pump thereof.

Another object of the invention is to provide a valve controlled, oil pressure operated motor associated with an internal combustion engine, having the valve controlled by the actuating member for the fuel pump of the engine.

A further object of the invention is to provide an oil pressure operated windshield wiper motor having a parking structure comprising a manually settable member automatically movable to stop the operation of the wiper at the end of a stroke thereof.

Figure 1:
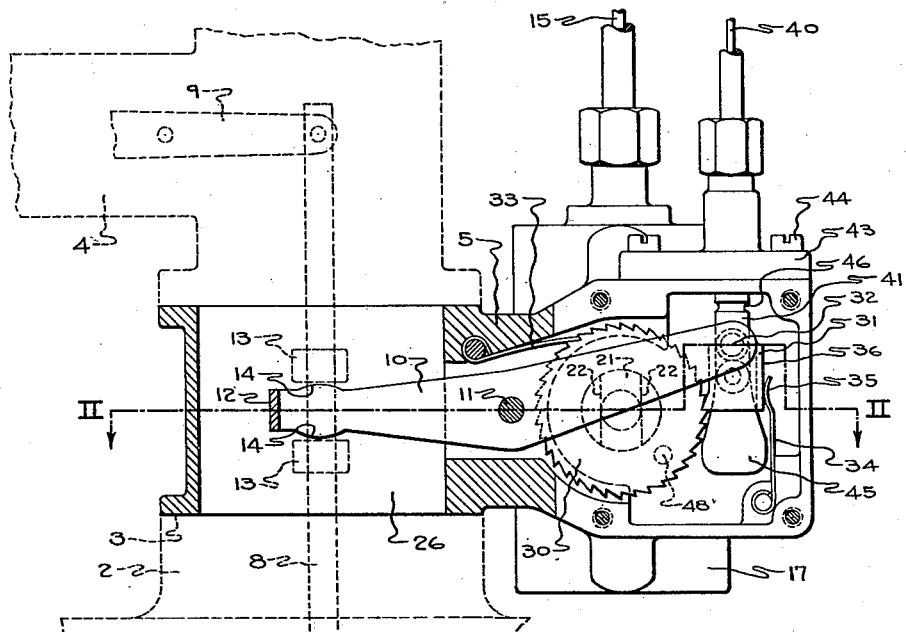
Figure 2:
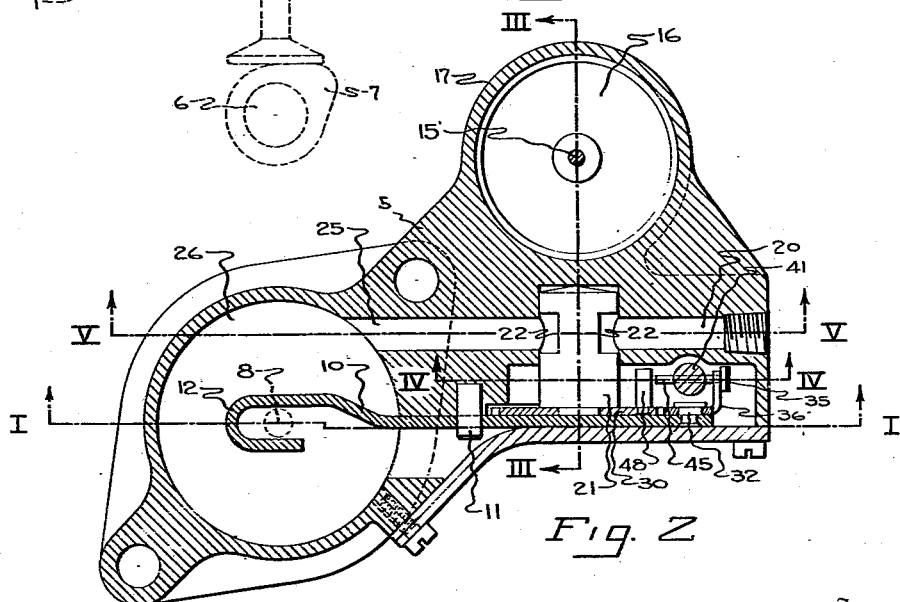

These and other objects residing in the combination, arrangement and construction of the parts will be apparent from the following specification when taken with the accompanying drawings, in which Fig. 1 is a section on the line I—I of Fig. 2 showing the mechanism of the present invention as associated with an internal combustion engine, Fig. 2 is a section on the line II—II of Fig. 1, Fig. 3 is a section on the line III—III of Fig. 2, Fig. 4 is a section on the line IV—IV of Fig. 2, Fig. 5 is a section on the line V—V of Fig. 2, and Fig. 6 is a detail of the another form of the invention.

Referring particularly to the drawings, the reference character 1 indicates the internal combustion engine of the automotive vehicle with which the windshield wiper driven by the mechanism comprising the present invention is associated. The engine 1 is provided with a cylinder oil filling pipe 2 having a seat 3 against which the conventional fuel pump casting is adapted to be secured. However, as disclosed particularly in Fig. 1, there is disposed between the seat 3 and the fuel pump casting a housing 5 supporting the windshield wiper driving mechanism. The engine 1 is provided with a cam shaft 6 having a cam 7 thereon in driving relation with a plunger 8 for actuating the engine fuel pump in the usual manner. In the present invention the plunger 8 is elongated to extend through the housing 5 in order to reach the fuel pump lever 9 to actuate the fuel pump. The plunger 8 is guided for vertical reciprocation in a fixed path and is reciprocated by the cam 7. It is held against the cam 7 by the resiliency of the fuel pump structure.

Disposed within the housing 5 is a lever 10 pivoted to the housing 5 by a pin 11. The lever 10 has a U-shaped end 12 surrounding the plunger 8 as shown in Fig. 2. On opposite sides of the end 12 are collars 13 affixed to the plunger 8 for oscillating the lever 10 about the pin 11 as the plunger 8 is reciprocated by the cam 7. Curved contact surfaces 14 are provided on the lever 10 for providing a rolling contact with the collars 13.

There may be one or two windshield wipers mounted and actuated in the same manner as disclosed in aforesaid patent. The wiper or wipers, which are not shown in the drawings, are actuated by a Bowden wire 15 disclosed particularly in Figs. 1, 3 and 5. The Bowden wire 15 is reciprocated by a piston 16 in a cylinder 17 as shown in Fig. 3. The piston 16 is reciprocated by oil from the pressure oil lubricating system of the internal combustion engine 1. Oil from the pressure side of the lubricating system is conducted through a port 20 and a distributing valve 21, the valve 21 being cylindrical in form and journaled in the housing 5. The active portions of the valve 21 consist of flat sides 22, shown particularly in Figs. 2 and 5. As appears most clearly in Fig. 5, oil from the pressure side of the lubricating system enters through the conduit 20 and in one position thereof, valve 21 directs the oil through a conduit 23 to the lower end of the cylinder 17 to move the piston 16 upwardly. At the same time spent oil in the cylinder 17 above the piston 16 is forced through a conduit 24 to the valve 21 and is directed by the valve 21 through a conduit 25 into the opening 26 defined by the housing 5 which communicates with and is a part of the cylinder oil filling pipe 2. It will be understood that the internal combustion engine is provided with an oil pump not shown. The pressure oil directed against the underside of the piston 16 moves the piston 16 to the upper end of the cylinder 17 to longitudinally move the Bowden wire 15 to provide the windshield wiper with a stroke in one direction as will be clear by reference to aforesaid patent.

For operation of the windshield wiper, the valve 21 is continuously rotated and for inoperation of the windshield wiper, the valve 21 is maintained motionless. As the valve 21 continues to rotate following the direction of oil under pressure to the lower end of the cylinder 17, it will assume a position in which one of the surfaces 22 thereof will direct pressure oil from the conduit 20 to the conduit 24 communicating with the upper end of the cylinder 17. At the same time the opposite surface 22 of the valve 21 will direct spent oil from beneath the piston 16 through the conduit 23 to the conduit 25 and into the opening 26 from which it is returned to the low pressure side of the lubricating system. Thus the oil passing through the conduit 24 will drive the piston 16 downwardly to move the Bowden wire 15 longitudinally to provide the windshield wiper with a stroke in the opposite direction. As the valve 21 continues to rotate, the piston 16 will be directed alternately from one end to the other of the cylinder 17 and thus reciprocate the Bowden wire 15 to operatively oscillate the windshield wiper back and forth in the usual manner.

The mechanism for rotating the valve 21 consists of a ratchet wheel 30 affixed to the valve 21 for rotation therewith and arranged to be rotated by a pawl 31 pivoted by a pin 32 to the lever 10. The pawl 31 and ratchet wheel 30 constitute an overrunning clutch structure. Retrograde movement of the ratchet wheel 30 is prevented by a spring detent 33 and pawl 31 is resiliently urged into operative engagement with the ratchet wheel 30 by a spring 34. As shown particularly in Fig. 1, the spring 34 is provided with a rounded end 35 which bears against a tail piece 36 of the pawl 31, angularly disposed with respect to the pawl 31, as shown most clearly in Fig. 2. Thus as the pawl 31 is moved back and forth under the action of the lever 10 it slides against the rounded end 35 of the spring 34. In its downward movement as viewed in Fig. 1 the pawl 31 engages with the teeth of the ratchet wheel 30 to provide the same with a predetermined rotation. During the upward movement of the pawl 31 as viewed in Fig. 1 the pawl 31 clicks over the teeth of the ratchet wheel 30, retrograde movement thereof being prevented by the spring detent 33.

The starting and stopping of the windshield wiper is under the control of a Bowden wire 40 terminating on the dash board or in some convenient place within the body of the automobile with which the wiper is associated. The Bowden wire 40 as shown particularly in Fig. 4 is connected to a plunger 41 which in turn is slidably mounted in a bore 42 in a cap 43 secured to the housing 5 by screws 44. To the inner end of the plunger 41 is pivoted a follower member 45. The follower member 45 is arranged to reciprocate adjacent the tail piece 36 of the pawl 31 under the action of the Bowden wire 40 and the plunger 41.

The plunger 41 is provided with two annular grooves 46 which are axially spaced apart and are arranged to co-act with a spring detent 47 shown in Fig. 4 and which is of the hairpin type. The spring detent 47 is disposed in a recess 48 in the cap 43 and yieldingly locks the plunger 41 in one of two positions as determined by the annular grooves 46. Thus when the Bowden wire 40 is pushed inwardly to the position shown in Fig. 4, the follower member 45 together with the plunger 41 are yieldingly locked in the inward position by the detent 47 resting in one of the annular grooves 46. When the Bowden wire 40 is pulled outwardly the other annular groove 46 will engage with the spring detent 47 to yieldingly hold the plunger 41 and the follower 45 in outward position. In outward position the enlarged portion of the follower member 45 is opposite the tail piece 36 of the pawl 31.

When the follower member 45 is in its outward position, it is in the path of movement of a pin 48 secured to the inside of the ratchet wheel 30 and movable therewith. As the pin 48 moves into contact with the follower member 45, it urges the follower member 45 against the tail piece 36 of the pawl 31 and moves it out of engagement with the ratchet wheel 30 against the action on the spring 34. While the pawl 31 is thus out of engagement with the ratchet wheel 30 it reciprocates idly under the action of the oscillating lever 10 and does not rotate the ratchet wheel 30. Thus the valve 21 remains stationary and the movement of the wiper stops. The pin 48 should be so positioned with respect to the ratchet wheel 30 and the position of the piston 16 that the valve 21 will be stopped in a position to continuously direct pressure oil against the end of the piston 16 which will have the result of insuring that the wiper blade stops at one end of its stroke and also at the same end of the stroke each time.

In Fig. 6 is disclosed another form of starting and stopping structure. In this form of the invention the plunger 41 has rigidly connected to it a follower member 45' which acts as a cam to cam the pawl 31 away from engagement with the ratchet wheel 30 by engaging the tail piece 36 of the pawl 31. Also, the pin 48 is dispensed with. Thus when it is desired to stop the wiper the Bowden wire 40 is actuated to pull the plunger 41 which pulls the follower member 45' which acts as a cam to urge the pawl 31 away from the ratchet wheel 30 and against the action of the spring 34. Conversely to start the wiper a push on the Bowden wire 40 will move the follower member 45' out of contact with the pawl 31 permitting it to be urged by the spring 34 back into operative engagement with the ratchet wheel 30.

As seen above, by using a pivoted follower 45 actuated by the pin 48 on the ratchet wheel 30, the windshield wiper always stops at the same end of its stroke. By omitting the pin 48 and making the follower 45' rigid with the plunger 41, the windshield wiper may stop at any point in its stroke.

While an important feature of the invention is the association of the windshield wiper mechanism with the fuel pump operating mechanism, it will be understood that there are features of the invention which are not limited to this association and to this extent it is contemplated that the power for actuating the mechanism may be taken from some other moving part of the vehicle with which the windshield wiper is associated than the fuel pump actuating reciprocating plunger.

Having thus described our invention, what we desire to secure by Letters Patent and claim is:

1. Intermittent drive mechanism comprising a rotating member, ratchet means for rotating said rotating member, means for actuating said ratchet means, manually operated means positionable to be automatically moved to move said ratchet means into inoperative position, and means movable with said rotating member to automatically engage said manually operated means in one position thereof to move said ratchet means to inoperative position.

2. Intermittent drive mechanism comprising a ratchet wheel, a driving pawl for rotating said ratchet wheel, means to actuate said driving pawl, resilient means for urging said pawl into operative engagement with said ratchet wheel, manually operated means positionable to be automatically moved to move said driving pawl to inoperative position, and a pin projecting from said ratchet wheel and movable therewith to engage said manually operated means in one position thereof to move said driving pawl against the action of said resilient means into inoperative position.

3. Intermittent drive mechanism comprising a ratchet wheel, a driving pawl for rotating said ratchet wheel, means to actuate said driving pawl, manually operable means positionable to be automatically moved to move said driving pawl to inoperative position, and means automatically operable to move said manually operated means in one position thereof to move said driving pawl into inoperative position.

4. Intermittent drive mechanism comprising a ratchet wheel, a driving pawl for rotating said ratchet wheel, means to actuate said driving pawl, manually operable means positionable to be automatically moved to move said driving pawl to inoperative position, and means movable with said ratchet wheel to engage said manually operable means in one position thereof to move said driving pawl into inoperative position.

5. Intermittent drive mechanism comprising a rotating member, means to drive said rotating member, manually operable means positionable to automatically render said driving means inoperative, and means movable with said rotating means to automatically act on said manually operable means to render said driving means inoperable to stop the rotation of said valve at a predetermined position with reference to the position of said rotating member.

RAYMOND JOSEPH STANLEY.
WILLIAM JOHN MARTERSTECK.